United States Patent [19]

Villarreal

[11] Patent Number: 4,636,846

[45] Date of Patent: Jan. 13, 1987

[54] OPTICAL SCANNING APPARATUS FOR INDICIA IMPRINTED ABOUT A CYLINDRICAL AXIS

[75] Inventor: Richard A. Villarreal, Kennewick, Wash.

[73] Assignee: The United States of America as represented by the United States Department of Energy, Washington, D.C.

[21] Appl. No.: 795,604

[22] Filed: Nov. 6, 1985

[51] Int. Cl.$^4$ .............................................. G06K 9/00
[52] U.S. Cl. ...................................... 358/100; 356/71; 350/574; 352/131
[58] Field of Search ........................... 358/100; 356/71; 350/171, 601, 574, 618, 622, 623, 624; 352/69, 94, 131

[56] References Cited

U.S. PATENT DOCUMENTS

| | | | |
|---|---|---|---|
| 4,229,069 | 10/1980 | Motin et al. | 350/96.29 |
| 4,286,287 | 8/1981 | Williams | 358/100 |
| 4,376,582 | 2/1983 | Kirchner | 356/71 |

FOREIGN PATENT DOCUMENTS

| | | |
|---|---|---|
| 761059 | 5/1971 | Belgium . |
| 139323 | 10/1978 | German Democratic Rep. . |
| 948003 | 1/1964 | United Kingdom . |
| 1048670 | 11/1966 | United Kingdom . |

OTHER PUBLICATIONS

R. F. Pulfer, "Television Techniques for Reactor Inspection", CEGB Tech. Dis. Bull., No. 253 (Sep. 1975).
McClellon and Iverson, "Visual Examination . . . ", Proc. of 23rd Conf. on Remote Systems Tech. (1975).

Primary Examiner—Jon W. Henry
Attorney, Agent, or Firm—Edward W. Nypaver; Robert Southworth, III; Judson R. Hightower

[57] ABSTRACT

An optical scanner employed in a radioactive environment for reading indicia imprinted about a cylindrical surface of an article by means of an optical system including metallic reflective and mirror surfaces resistant to degradation and discoloration otherwise imparted to glass surfaces exposed to radiation.

11 Claims, 7 Drawing Figures

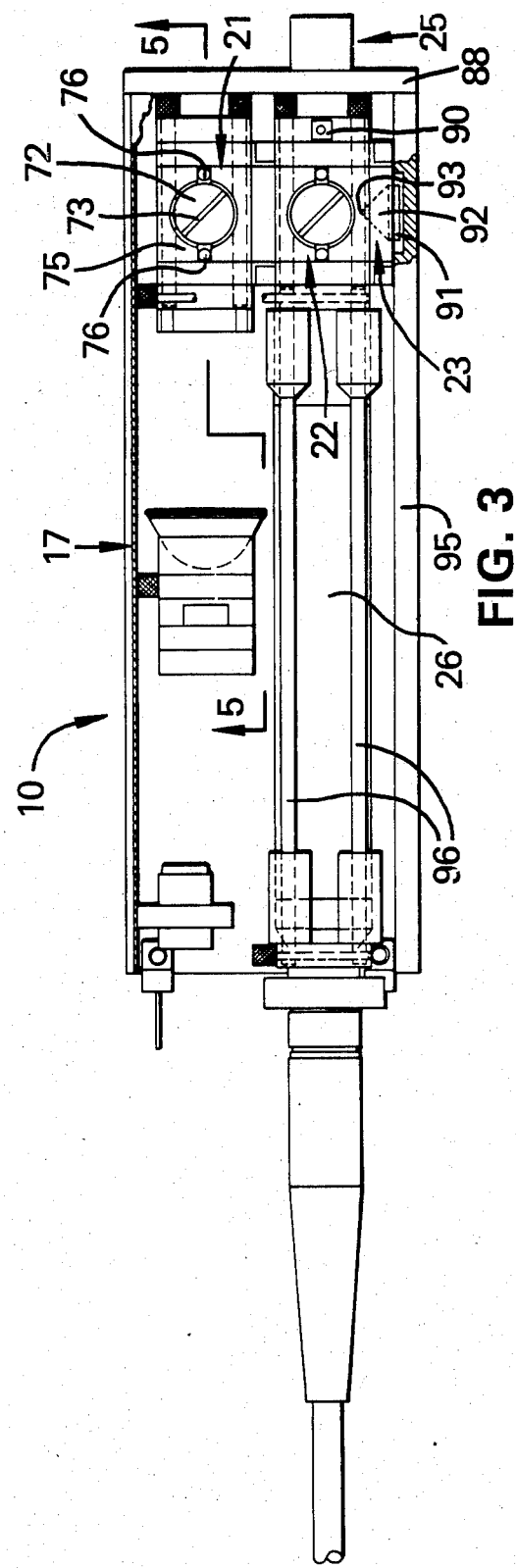

OPTICAL SCANNING APPARATUS FOR INDICIA IMPRINTED ABOUT A CYLINDRICAL AXIS

The U.S. Government has rights in this invention pursuant to contract No. DE-AC06-76FF02170 between the U.S. Department of Energy and the Westinghouse Electric Corporation.

BACKGROUND OF THE INVENTION

This invention relates generally to an optical identification system and, more particularily, to a reader head for optically scanning indicia imprinted about a cylindrical surface.

Upon removal of nuclear fuel assemblies from a nuclear reactor, the multiplicity of fuel elements or pins contained therein are removed from the assemblies which are temporarily located in a "hot cell" for analysis and reprocessing. These pins are stamped with indicia in the form of a character code prior to insertion into the reactor for the purpose of identifying each pin upon removal after irradiation. This character code is imprinted about the cylindrical surface of one end of the pin and operator identification of such indicia is difficult because of several physical and environmental conditions. For example, the fuel pin is highly radioactive and physically located not less than 6 feet from the operator. Moreover, the operator's visibility is limited since he must view the pins through 4 feet of leaded glass. Other constraints include the inability to rotate the pin and the difficulty in maintaining the pin in a vertical attitude.

Some attempts have been made to scan or read the indicia in a more efficient manner. One such attempt employs a conical annulus prism to image the characters to a plane and a fiber optic bundle to transmit the image to a remote video camera. However, this technique possesses disadvantages in that the fuel pin tends to scratch and thereby damage the inner surface of the prism which is very expensive to replace. Also, radiation degrades or darkens the glass in both the prism and the fiber optic bundle. While quartz glass will reduce the darkening or browning effect, the cost of a quartz fiber optic bundle is cost prohibitive.

Another approach for reading the imprinted characters utilizes a circumferential array of fiber optic bundles to directly view all of the characters and transmit the image to a camera. This technique also suffers glass browning and scratching problems. Moreover, the image is difficult to read when a character lies between two bundles and when the surface of the pin is dull.

Accordingly, it is primary object of the present invention to obviate the above noted shortcomings by providing a new and useful optical scanning apparatus for remotely and precisely identifying relatively small indicia characters imprinted on a small diameter cylindrical surface.

It is another object of this invention to provide in the foregoing apparatus a reader head comprised of components having non-degradable reflecting surfaces.

It is further object of the present invention to provide in the above optical scanning apparatus metalized reflecting surfaces avoiding degradation and discoloration thereof.

The foregoing and other objects, advantages, and characterizing features of this invention will become clearly apparent from the ensuing detailed description of an illustrative embodiment thereof, taken together with the accompanying drawings wherein like reference numerals denote like parts throughout the various views.

SUMMARY OF THE INVENTION

An optical scanning apparatus for reading indicia arranged about a cylindrical surface by means of an optical system including a metal diffuser, a beam splitter, and a conical mirror having a metallic reflective surface. The reflective conical surface transmits the image of an indicia imprinted cylindrical surface to a television camera.

BRIEF DESCRIPTION OF THE DRAWING FIGURES

FIG. 3 is a top plan view of the optical scanning apparatus of this invention with the cover removed for the sake of clarity;

FIG. 4 is a side elevational view of the optical scanning apparatus of FIG. 3 with cover removed;

DETAILED DESCRIPTION OF A PREFERRED EMBODIMENT

Figure 1:
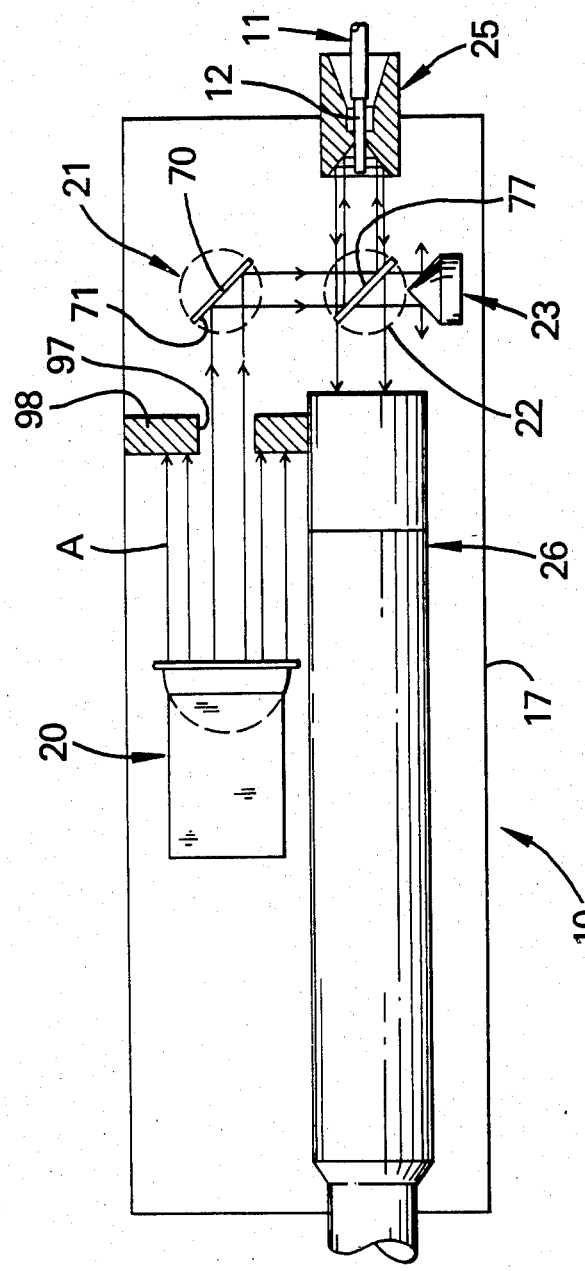
FIG. 1 is a schematic view of an optical scanning apparatus of this invention.
Figure 2:
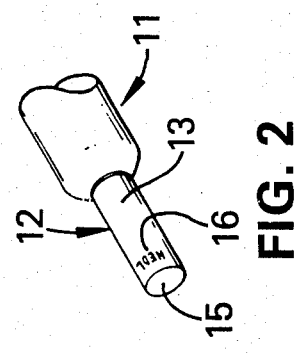
FIG. 2 is a fragmentary perspective view of one end of a fuel pin having indicia imprinted thereon.

Referring now in detail to the illustrative embodiment depicted in the accompanying drawings, there is showing schematically in FIG. 1 an optical scanning apparatus, comprehensively designated 10, for optically scanning indicia imprinted about a circumferential area of a curved surface. While not limited thereto, the apparatus 10 is especially suited for scanning and reading indicia inscribed about the cylindrical surface of a nuclear fuel pin end cap. A typical nuclear fuel pin 11 includes an end cap 12 (FIG. 2) having an outer cylindrical surface 13 terminating in a planar flat end face 15. Imprinted indicia 16 is arranged circumferentially about the surface 13 and can be any selected combination of letters, numerals or other symbols to form a code for identification or other purposes.

The scanning apparatus 10 includes a frame or housing 17 which can be hand-held or machine supported on an apparatus (not shown) providing relative axial movement between apparatus 10 and a fuel pin 11 being identified thereby. The apparatus 10 is adapted to receive the end cap portion 12 of a single fuel pin 11 (FIG. 1) and automatically read the indicia 16 imprinted about cylindrical surface 13. During this sequence, the fuel pin 11 and apparatus 10 are held stationary.

Figure 5:
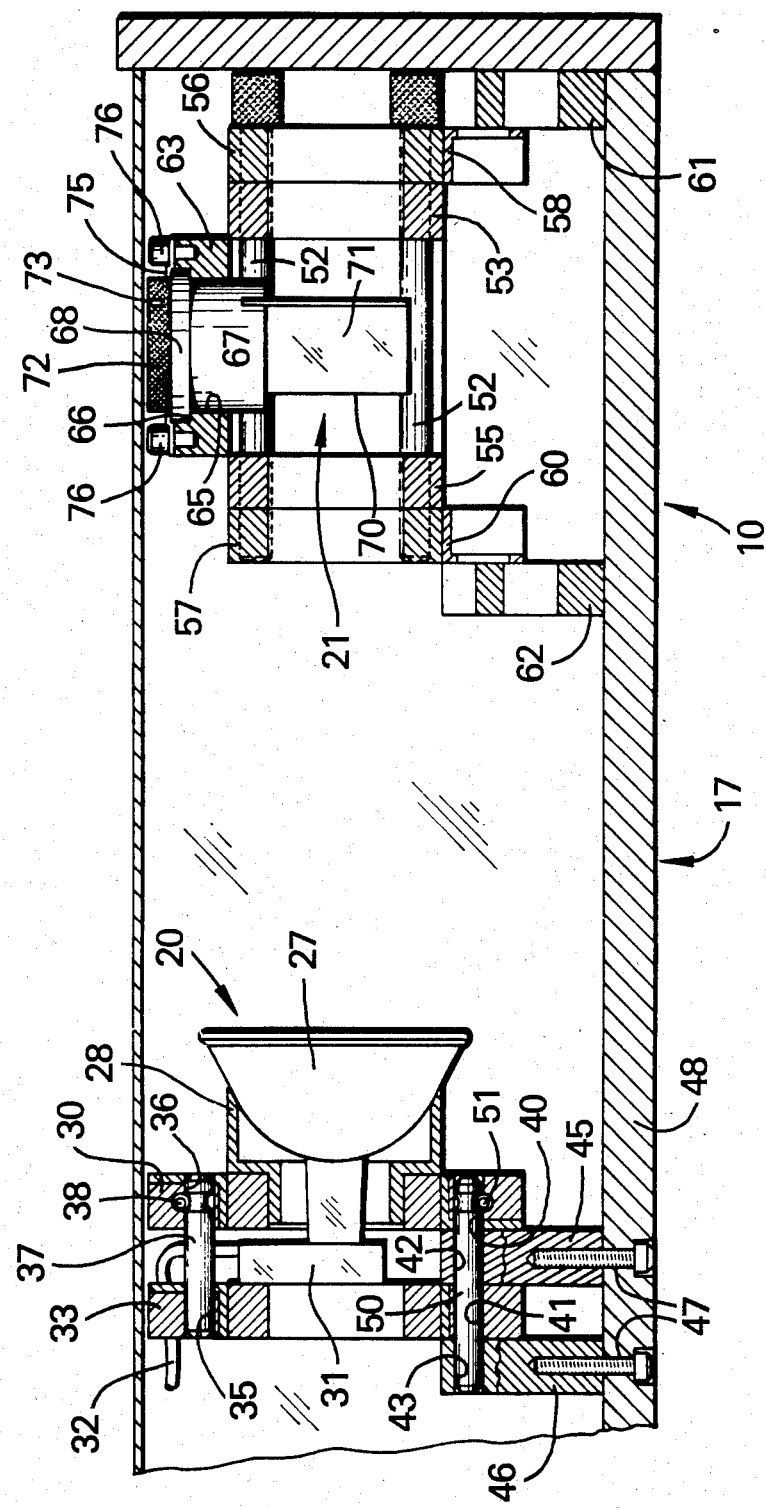
FIG. 5 is a longitudinal sectional view taken along the line 5—5 of FIG. 3.

Basically, apparatus 10 comprises a light source 20, a metal diffuser 21, a metalized quartz beam splitter 22, a light trap 23, a metal conical mirror 25, and a radiation hardened miniature camera 26. As best shown in FIG. 5, the light source 20 is in the form of a lamp 27 for providing light to illuminate the desired image, specifically the indicia 16 on the cylindrical surface of fuel pin 11. The lamp 27 is mounted in a spacer housing 28, in turn rigidly secured to a support plate 30. The lamp 27 is secured to a base member 31 and is provided with an electrical lead 32 for connection to a suitable source of electrical power (not shown).

The base member 31 is secured to a support plate 33 having apertures 35 aligned with the apertures 36 formed in support plate 30. These upper apertures 35 and 36 receive a rod 37 releasably secured in plate 30 by means of a retaining ring 38. The plates 30 and 33 also are formed with lower apertures 40 and 41 aligned with apertures 42 and 43 formed in support blocks 45 and 46 which are rigidly secured, as by fasteners 47, to the bottom wall 48 of housing 17. An alignment rod 50 is received in these lower aligned apertures and is secured to plate 30 by a retaining ring 51.

The diffuser 21 forms part of an assembly including a support arrangement comprised of a plurality of elongated rods or alignment pins 52 extending through aligned openings formed in inner apertured adapter plates 53 and 55 and outer, apertured support plates 56 and 57. The outer plates 56 and 57 are supported on angle members 58 and 60 attached to support blocks 61 and 62 anchored or otherwise fixedly secured to the housing bottom wall 48. A diffuser support block 63 is mounted on adapter plates 53 and 55 and is formed with a central bore 65 having a counterbore at the upper end thereof to define an annular shoulder 66.

The diffuser 21 includes a cylindrical body 67 having a flange 68 adjacent the upper end thereof adapted to seat on shoulder 66. A metal diffuser plate 70 is attached to the body 67 and is provided with a metallic diffusing surface 71 for diffusing a portion of light and reflecting light without glare. The upper end of diffuser 21 is provided with a knurled head 72 having a transverse slot 73 for the reception of a screwdriver or other appropriate tool to turn the plate 70 and thereby surface 71 to the desired orientation for reflecting light from source 20 in a desired path. Once properly adjusted, the diffuser is locked in such position by means of a keeper plate 75 bearing down on flange 68 with a clamping force effected by screws 76.

The beam splitter 22 is constructed similarity to the diffuser 21 except that the former is provided with a transparent, metalized quartz plate 77 (FIG. 1) adapted to transmit as well as reflect light. Since the supporting structure for beam splitter 22 is identical to that described above for diffuser 21, it is believed that no further amplification or description thereof is necessary. Suffice it to say that beam splitter 22 is positioned in a side-by-side relation with diffuser 21 and can be adjusted to orient its plate 77 in a manner directing light rays in a desired path.

The conical mirror 25 (FIGS. 1 and 6) comprises a generally cylindrical, metallic, body member 80 formed with a central through bore 81 for receiving one end of a fuel pin 11. The bore 81 is counterbored, as at 82, to provide sufficient clearance for the wire 83 customarily wrapped about the pin 11. The transition between bore 81 and the enlarged diameter counterbore 82 defines a shoulder or stop 84 against which the point of attachment of wire 83 seats, thereby assuring that the end portion of fuel pin 11 is properly located in an unobstructed, stationary position relative to the optics embodied in this invention.

The outer or rear end of body 80 is provided with a tapered inlet 85 to facilitate entry of the pin 11. The inner end of body 80 is provided with a conically shaped face constituting a highly polished, metallic, conical mirror surface 86 capable of clearly reflecting the image i.e., the indicia imprinted about the cylindrical surface of the pin 11.

The cylindrical body 80 is mounted within a sleeve 87 extending through an end wall 88 of housing 17 (FIGS. 3 and 4). A keeper element 90 projects radially through sleeve 87 and against the body 80 for securing the same in place.

The light trap 23 is formed with a cylindrical portion 91 and an integral conical portion 92 terminating in an apex 93 positioned in the path of the light rays transmitted through beam splitter 22. While the trap 23 is shown as having a conical configuration, it should be understood that other suitable light absorbing or dissipating means of various shapes can be used in lieu of the trap 23, so long as the light directed thereagainst is not reflected back into the desired optical path. The trap 23 is mounted in the side wall 95 of housing 17 with the apex 93 oriented in a direction 90° from the longitudinal axis of mirror 25.

The television camera 26 is of a radiation hardened type, such as that manufactured by Rees Instruments of Palm Springs, Calif. The camera 26 is supported on a plurality of longitudinally extending rods 96 mounted at their opposite ends, as by retaining rings 97, in end support plates 98 and 100. The camera 26 extends longitudinally of the housing 17 and is adjusted in a manner coaxially aligning the lens thereof with the beam splitter plate 77 and the conical mirror surface 86 for viewing the image reflected by the latter and transmitted through beam splitter 22. Suitable bushings 101 are mounted on the opposite ends of each rod 96 and bear against adjacent hardware located within the housing 17. A multi-foil thermal barrier 102 is disposed about a major portion of camera 26 to shield the latter from extreme temperature conditions.

Figure 6:
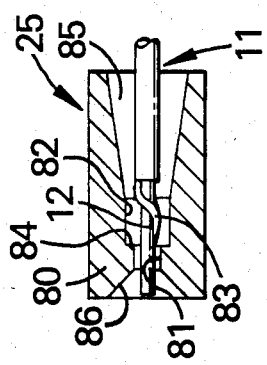
FIG. 6 is a longitudinal sectional view of the conical mirror assembly incorporated in this invention.

In use, as shown in FIGS. 1 and 6, the apparatus 10 is brought into contact with the fuel pin 11 with the end portion of the pin extending within the scope of mirror surface 86 sufficiently to adequately expose the indicia imprinted about the circumference of end and cap 12 of pin 11. Light emitted from source 20 is directed along a path identified by arrows A and through an aperture 97 of a beam stop 98 onto the diffuser 21 which reflects the light 90° toward beam splitter 22. The beam splitter plate 77 reflects a portion of the light to the mirror surface 86 and simultaneously transmits a portion to the light trap 23 which deflects the light precluding reflection back into the desired optical light path. The light directed onto mirror surface 86 illuminates the indicia 16 and reflects the image, via mirror surface 86, through beam splitter 22 onto the lens of camera 26. The camera 26 is suitably connected to control circuitry (not shown) for transmitting the image received to a visual display apparatus (also not shown). Since such optical recognition arrangements are well known and, per se, form no part of this invention, no further amplification or description thereof is believed necessary.

A significant feature of this invention resides in forming the conical mirror, and particularly the reflective surface thereof, from metal to preclude degradation of such surface and consequently the optical image in a radiation environment. Also, such a metal mirror is easily and inexpensively made by one machining process thereby eliminating the several coating and laminating steps required of conventional glass mirrors employed in such environments. Another advantage residing in the mirror member of this invention is that the fuel pin or other article to be identified is fed into its desired position through the rear end of the mirror member to prevent any scratching or marring of the optical surface 86.

The diffuser 21 eliminates glare while, because of its metalized diffusing surface, maintains the desired intensity of light transmitted to the pin's surface. Like the mirror 25, the metallic diffuser 21 is readily fabricated and is not degraded by irradiation exposure. The only component susceptible to degradation is the quartz beam splitter 22 which will brown upon continued use in an irradiation atmosphere. However, only the intensity of the light beam will be affected and this can be compensated for by increasing the light intensity or increasing the camera aperture. Since the cost of the non-camera components is relatively low, the entire apparatus 10, except for camera 26, can be discarded in event of accidental damage thereto. This simplifies the design since remote removal, replacement, alignment, and adjustment of individual components can be completely eliminated.

Figure 7:
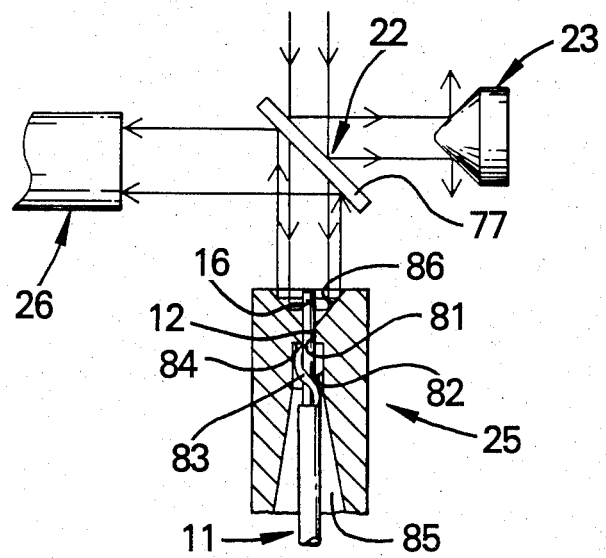
FIG. 7 is a fragmentary, schematic view of another form of an optical scanning apparatus of this invention.

FIG. 7 illustrates another form of the present invention which is similar to that shown in FIG. 1 with the exception that the locations of trap 23 and conical mirror 25, respectively, are reversed. In this embodiment, the light directed onto beam splitter 22 is partially transmitted to the mirror surface 86 and partially reflected to the light trap 23 for dissipating such light and preventing reflection thereof back into the optical path. The portion of light directed onto mirror surface 86 illuminates the indicia 16 and reflects the image, via surface 86 onto beam splitter 22, in turn reflecting such image to the lens of camera 26. This embodiment has the advantage of reflecting the image of pin 11 without having to transmit the same through the rear face of beam splitter 22, which is often provided with coatings vulnerable to deterioration in time. Thus, a clearer image is assured if reflected from the non-coated surface of beam splitter plate 77.

The foregoing description of preferred embodiments of this invention have been presented for purposes of illustration and description only. They are not intended to be exhaustive or to limit the invention to the precise forms disclosed, and obviously many modifications and variations are possible in light of the above teaching. It is intended that the scope of the invention be defined by the claims appended hereto.

I claim:

1. An apparatus for optically scanning indicia imprinted about a cylindrical surface of an article comprising: a frame, a camera mounted on said frame, a light source for emitting a collimated light beam, a beam splitter mounted on said frame, means mounted on said frame for diffusing a portion of said light beam and reflecting a portion thereof onto said beam splitter, said beam splitter directing said light beam onto said cylindrical surface of said article for illuminating the indicia imprinted thereon, and means including a metallic mirror surface for reflecting an image from said imprinted cylindrical surface for transmission through said beam splitter to said camera.

2. An apparatus according to claim 1, wherein said reflecting means comprises a body member having at one end thereof a conically shaped recess defining a conical face, said metallic mirror surface formed on said face, said body member having a bore therethrough for receiving said article, said bore communicating with said recess to dispose an end portion of said article within said recess.

3. An apparatus according to claim 2, wherein said body member is formed at the other end thereof with a tapered inlet communicating with the other end of said bore, said article inserted through said tapered inlet into a desired position within said bore.

4. An apparatus according to claim 3, wherein said bore is formed with an enlarged diameter portion defining a shoulder against which a portion of said article seats to locate said article in a desired position relative to said mirror surface.

5. An apparatus according to claim 2, wherein said body is formed of metal, and said mirror surface is highly polished to provide a clear reflecting surface.

6. An apparatus according to claim 1 wherein said diffusing means comprises a rotatable body, a plate attached to said body, said plate having a metallic mirror surface for diffusing and reflecting light.

7. An apparatus according to claim 6, including means for rotatably adjusting said body to position said mirror surface of said plate in a desired orientation relative to said light source and said beam splitter.

8. An apparatus for optically scanning indicia imprinted about a cylindrical surface of an article comprising: a frame, a camera mounted on said frame, a light source for emitting a collimated light beam, a beam splitter mounted on said frame, means mounted on said frame for diffusing a portion of said light beam and reflecting a portion thereof onto said beam splitter, said beam splitter transmitting said light beam onto said cylindrical surface of said article for illuminating the indicia imprinted thereon, and means including a metallic mirror surface for reflecting an image from said imprinted cylindrical surface onto said beam splitter for reflection to said camera.

9. An apparatus according to claim 8, wherein said reflecting means comprises a body member having at one end thereof a conically shaped recess defining a conical face, said metallic mirror surface formed on said face, said body member having a bore therethrough for receiving said article, said bore communicating with said recess to dispose an end portion of said article within said recess.

10. An apparatus according to claim 9, wherein said body member is formed at the other end thereof with a tapered inlet communicating with the other end of said bore, said article inserted through said tapered inlet into a desired position within said bore, said bore being formed with an enlarged diameter portion defining a shoulder against which a portion of said article seats to locate said article in a desired position relative to said mirror surface.

11. An apparatus according to claim 8 wherein said diffusing means comprises a rotatable body, a plate attached to said body, said plate having a metallic mirror surface for diffusing and reflecting light, and means for rotatably adjusting said body to position said mirror surface of said plate in a desired orientation relative to said light source and said beam splitter.

* * * * *